Oct. 9, 1962 D. F. RIETZ 3,057,523
MEAT DISPENSER FOR PIZZA PRODUCTION
Filed May 6, 1959 2 Sheets-Sheet 1

INVENTOR:
Donald F. Rietz,
BY
Bair, Freeman & Molinare
ATTORNEYS.

Oct. 9, 1962        D. F. RIETZ        3,057,523
MEAT DISPENSER FOR PIZZA PRODUCTION
Filed May 6, 1959        2 Sheets-Sheet 2
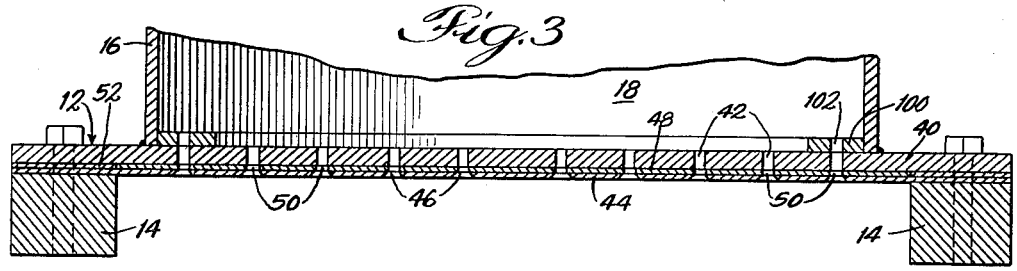
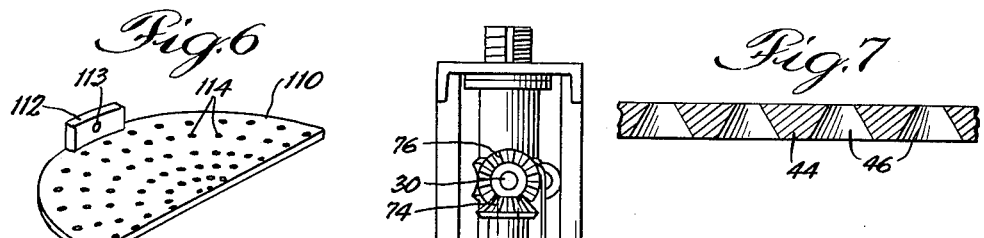
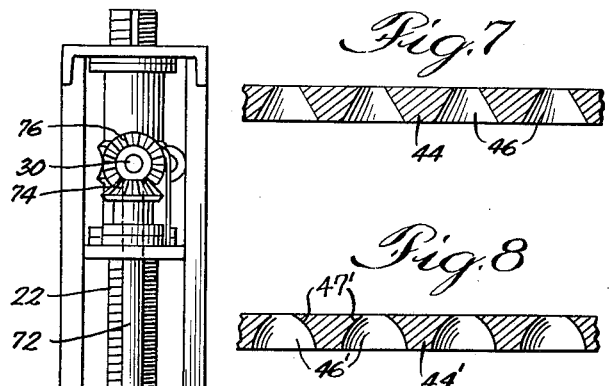
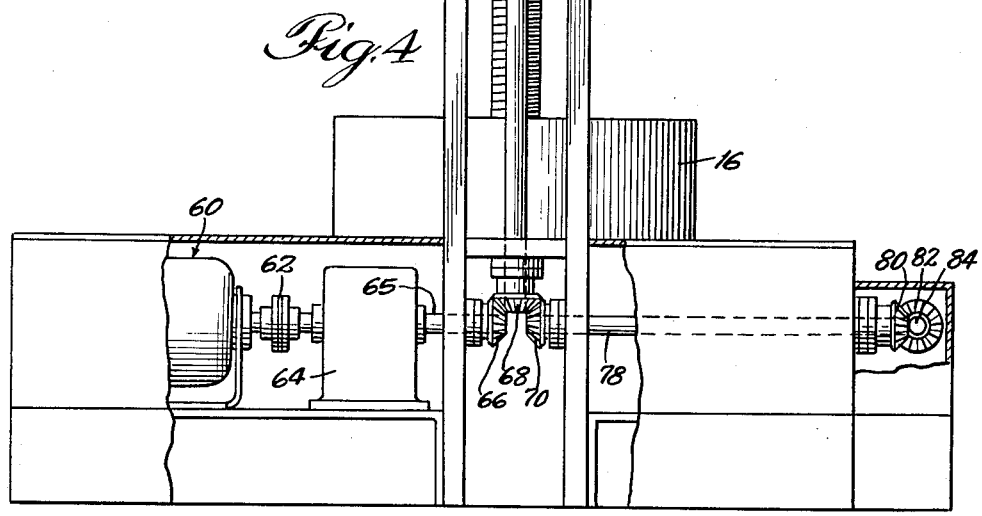
INVENTOR:
Donald F. Rietz,
BY Bair, Freeman & Molinare
ATTORNEYS.

United States Patent Office 3,057,523
Patented Oct. 9, 1962

3,057,523
MEAT DISPENSER FOR PIZZA PRODUCTION
Donald F. Rietz, 3201 S. Pulaski Ave., Chicago 23, Ill.
Filed May 6, 1959, Ser. No. 811,438
7 Claims. (Cl. 222—387)

This invention relates to a meat dispenser and more particularly to a dispenser for pizza meat which is designed to facilitate mass production of pizza-type comestibles.

The Italian dish of pizza has had a great increase in popularity in recent years. However, the production of this food is, today, primarily a hand operation. In the production of a meat-type pizza, the labor problem is particularly severe, since much labor time is consumed in the forming of small balls, or chunks, of pizza meat and in the manual distribution of a large plurality of such chunks onto the surface of the pizza before it is ready to be cooked to final form. Inasmuch as the pizza chunks must presently be manually formed, in desired size, from a large refrigerated mass of fibrous meat, it will be appreciated that the labor problem is thereby aggravated, since not only must the workers tear off meat chunks of desired size, but the refrigerated mass of meat offers substantial resistance to such operation by reason of the presence therein of chilled liquids such as fats, blood, etc.

Thus, it is the principal object of this invention to provide a machine for automatically forming, and dispensing therefrom, pizza meat chunks for use in the mass production of pizzas.

The machine of this invention must be able to handle the problem of formation of pizza meat chunks of selected size, despite the fact that the mass of meat from which the chunks are to be formed will normally be cold, having been refrigerated, and despite the fact that the natural viscosity of the meat mass is relatively high by reason of the present therein of chilled liquids such as fats, blood, etc.

Accordingly, another object of this invention is to provide a pizza meat dispensing machine which overcomes the problems incident to forming a large mass of refrigerated meat, of relatively high viscosity, into relatively small pizza meat chunks, and which machine operates to dispense the meat chunks therefrom in a predetermined pattern.

A further object of this invention is to provide a dispensing machine for pizza meat chunks which may be readily selectively converted to dispense meat therefrom for use with pizzas of different size.

Still another object of this invention is to provide a machine which accomplishes all the foregoing objectives and which is further characterized by its simplicity and inexpensiveness of construction, and by its efficiency of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 3 is an enlarged fragmentary cross-section view of the meat extruding and severing plate portion of the machine of FIGURES 1 and 2, and is taken on line 3—3 of FIGURE 2.

FIGURE 4 is an elevation view similar to FIGURE 1 and taken looking from the left of FIGURE 1, and with parts broken away to show certain portions of the machine's drive means.

FIGURE 6 illustrates, in perspective, a modified form of a selectively movable moulding plate which is utilized for varying the area over which pizza meat will be dispensed from a machine of the type shown in FIGURES 1 to 5.

FIGURE 7 is an enlarged, fragmentary, cross-section view showing the shape of the extrusion apertures in the lower extrusion plate.

FIGURE 8 is similar to FIGURE 7, but shows a modified shape of the extrusion apertures in the lower extrusion plate.

Figure 1:
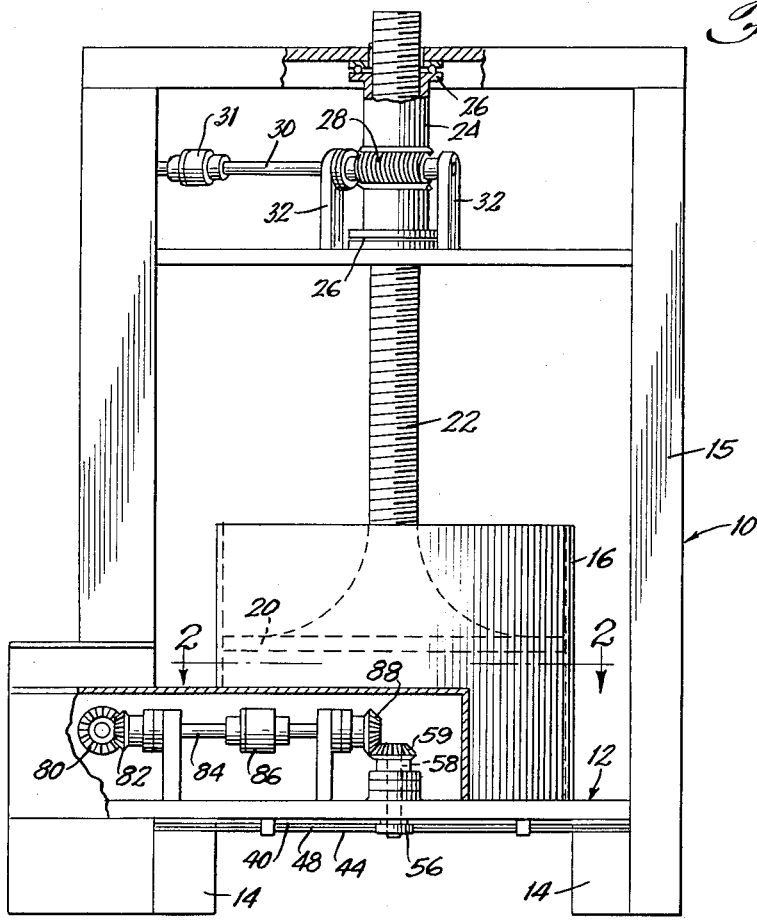
FIGURE 1 is a semi-diagrammatic elevation view of a pizza meat dispensing machine constructed in accordance with my invention, and with parts of the figure broken away to show portions of the drive means for the machine.
Figure 2:
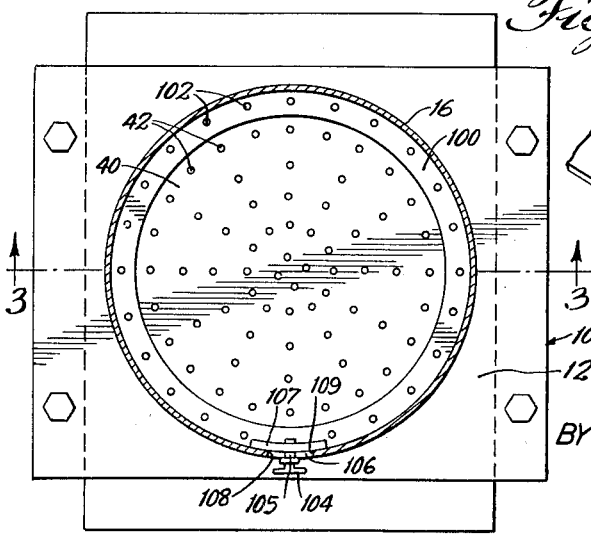
FIGURE 2 is a plan view of the extruding plate portion of the machine of FIGURE 1, and is taken substantially on line 2—2 of FIGURE 1.

Referring now to the drawings, the pizza meat dispensing machine is generally designated at 10, and has a frame which includes an elevated base 12 mounted on a plurality of depending support legs 14, and including a superstructure 15 extending above the base. Supported on the base 12 is an upright, cylindrical hopper means 16 of stainless steel, the interior of which defines an elongated storage space 18 for receiving pizza meat therein.

There is provided a pressure means which enters the upper open end of the stainless steel cylinder 16, and there is provided, in base 12, a dispensing means which extends across the lower open end of stainless steel cylinder 16, and from which the particles of pizza meat are dispensed. More specifically, and with respect to the means for applying pressure to the pizza meat located within chamber 18, there is provided a rigid, relatively thick, pressure plate 20, preferably of stainless steel or the like, which fits peripherally in close sliding relation with the inside of cylinder 16. The pressure plate 20 is arranged to be advanced downwardly and to apply onto the mass of meat in chamber 18 a uniform pressure for effecting extrusion, and movement, of the meat through the dispensing means at the lower end of the cylinder 16. The pressure plate 20 is selectively advanced through means of a screw-threaded stem 22 which connects to the upper side of pressure plate 20. An upper portion of threaded stem 22 is journaled in a sleeve 24 that is appropriately journaled in bearings 26 carried by superstructure 15. The threaded stem 22 is selectively advanced or retracted through the means of a worm gear 28 that engages stem 22 and which is carried on shaft means 30 journaled in standards 32 that are carried on superstructure 15. A timer clutch 31 is interposed in the shaft means 30 for driving the gear 28. The means for driving gear 28 will be described hereinafter.

With respect to the dispensing means located across the bottom end of cylindrical meat container 16, the said meat container cylinder 16 is shown to be rigidly secured, by means of welding or the like, to a relatively thick moulding plate 40 which is provided with a plurality of apertures 42 therethrough, the apertures 42 being appropriately sized and spaced from each other to determine the pattern in which the pizza meat is to be dispensed therefrom. There is also provided a second plate 44 spaced below and parallel to the lower surface of the first moulding plate 40 and having therein a plurality of spaced apertures 46 which are arranged in axial alignment, or register, with the apertures 42 in plate 40. There is also provided a selectively movable severing plate 48 which is positioned in the space between the parallel plates 40 and 44. The severing plate 48 is provided with a plurality of spaced apertures 50 which are equal in number to the sets of apertures 42 and 46, and which are disposed in a similar pattern so that the movable severing plate, when in one position, has its apertures in register with the apertures in plates 40 and 44, while in a second position the apertures in plate 48 are offset and out of register with the apertures in plates 40 and 44.

Figure 5:
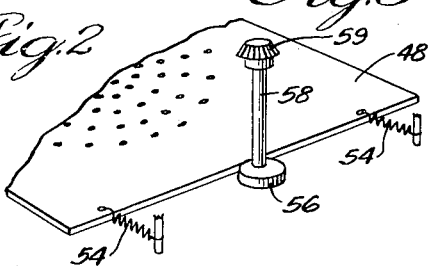
FIGURE 5 is a fragmentary perspective view showing the cam drive for the severing plate shown in FIGURES 1 and 3.

The plates 40 and 44 are appropriately shimmed apart by shims 52 therebetween, and said plates together with shims 52 serve as guide means for limiting movement of the plate 48 along a selected traverse, or excursion. The spacing between plates 40 and 44 is substantially equal to the thickness of severing plate 48 to prevent extrusion of meat between adjacent walls of said plates. Means are provided for effecting movement of severing plate 48, including a plurality of springs 54 which normally bias the plate 48 in one direction to a position wherein the apertures in the plates are in register. A cam 56 is provided which is operative, when rotated, to effect movement of the plate 48 against the normal bias of the springs 54 to a position where apertures 50 are out of register. The cam 556 is carried on a shaft 58 that is provided with a bevel drive gear 59, as best seen in FIGURES 1 and 5.

Referring now to the drive for effecting operation of the device here disclosed, there is provided a single source of power for effecting both advancement of the pressure plate 20 and reciprocation of the severing plate 48. As shown in FIGURE 4, there is provided an electric motor 60, a coupling 62, and a gear reducer 64, having an output shaft 65 carrying drive bevel gear 66. Power is taken off bevel gear 66 by means of meshing gears 68 and 70. Gear 68 transmits power to shaft 72 and gear 74, which in turn, transmits power to gear 76 and to shaft means 30 for effecting rotation of the worm gear 28. An appropriate clutch means, and preferably a timer clutch, 86 is interposed in the power train between gear 68 and worm 28. The gear 70 is carried by shaft 78 and power therefrom is transmitted through meshing gears 80 and 82 to shaft 84, and shaft 84 drives meshing gears 88 and 59 for effecting rotation of shaft 58 which carries the cam means 56.

Referring now to some of the particular details disclosed, the lowermost plate 44 having apertures 46 therein is formed to have said apertures 46 with a downwardly and outwardly flaring bevel, as best seen in FIGURE 3, and these beveled apertures 46 reduce the area of contact between plate 44 and the severed meat chunks, and thereby reduce the likelihood of meat chunks adhering to the plate 44 or to the edges of the apertures 46. It must be understood that the meat that is being extruded under pressure through the apertures in the dispensing means has certain natural liquids therein, such as blood and fat, which give the meat a propensity for sticking to surfaces, and, to avoid having severed meat stick to the outermost plate 44, the beveled apertures 46 serve the purpose of avoiding good contact with the severed meat particles, and thereby functions to effect full release of the meat particles.

It will be understood that when the apertures 42, 50 and 46 are in register, or alignment, the meat is extruded under pressure from plate 20 through said apertures. By reciprocating the severing plate 48 at selected intervals timed to the advance of the pressure plate 20, the extruded lengths of meat are severed to produce meat chunks of a desired size that have passed plate 48, and the severed particles or chunks then prop onto a pizza disposed beneath the plate 44. The plates 44 and 48 are desirably of relatively thin dimension, and it should be particularly understood that the severing plate should be of relatively thin dimension so as to effect good severing of the extruded meat. The upper plate 40 is of substantial thickness relative to plates 44 and 48, and the heavy plate 40 operates to withstand the pressure applied to the meat by the pressure plate 20 and furthermore, the apertures 42 therethrough are elongated which serves to assist in defining the contour of the extrusion passing therethrough.

In the form of the device shown in FIGURE 3, there is provided within the cylindrical hopper 16 a ring 100 having apertures 102 therein for registration with certain of the apertures 42 in plate 40. When the apertures 102 are aligned with apertures 42, the ring 100 does not affect the extrusion of meat. When the ring 100 is rotated arcuately so that the apertures 102 are misaligned with the apertures 42 beneath ring 100, then the ring 100 serves as an obstruction to reduce the area over which the meat will be dispensed from the dispensing means, and the ring 100 thereby serves as a selectively variable means for adjusting the area over which chunks of meat are dispensed. In order to actuate the ring 100, there is provided a handle 104 on a stem 105 which extends laterally through an elongated slot 106 provided in the wall of cylinder 16. An upstanding arcuate flange 107 overlaps slot 106 at all times to prevent extrusion through slot 106. The ends of the slot 106 are arranged so that when the stem 105 is in one extreme position against one end 108 of the slot, then the apertures 102 and 42 are aligned, and when the stems 105 is in the other extreme position against the edge 109 of slot 106, then the apertures 102 and 42 are misaligned.

In still another modified form of device illustrated in FIGURE 6, the obstruction means for limiting dispensing of pizza through the dispensing means includes a semicircular plate 110 which is provided with an upstanding arcuate flange 112 similar to flange 107 and with a stem 113 similar to stem 105. The semi-circular plate 110 is provided with a plurality of apertures 114 which are adapted to align with apertures 42, when the semi-circular plate is in one position, and to be misaligned with apertures 42 when in its other position. By using the plate 110 of FIGURE 6, the machine can be selectively adjusted to dispense meat over the entire area, as above described, or only over half the entire area, as is frequently desired in the production of combination-type pizzas. It will be evident that the obstruction plates, or constructions, as disclosed in FIGURES 3 and 6, may be of various shapes and arrangements, so as to obtain various patterns of distribution from the dispensing means.

In the operation of the drive means for both the advance of the pressure plate 20 and the reciprocation of the severing plate 48, it will be understood that it is desired to first extrude a desired amount of meat and then cease extrusion after which the machine will sever the extruded meat chunk from the meat mass. Accordingly, the timer clutch 31 operates to transmit power from motor 60 to gear 28 for a pre-selected period whereupon the timer in clutch 31 operates to discontinue further extrusion, and thereafter the high point on cam 56 operates to actuate the severing plate 48. Obviously, the period of dwell of cam 56 during the extrusion operation may be varied as desired, and would be synchronized with the operation of timer clutch 31.

FIGURE 8 shows a modified shape for the extrusion apertures 46' in the outermost extrusion plate 44'. In FIGURE 8 the walls 47' of the apertures 46' are arcuate and concave, thereby providing a fairly sharp edge adjacent the portion of aperture 46' which is of smallest dimension, and with the walls 47' then receding rapidly away from the sharp edge.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A pizza meat dispenser comprising, in combination, an axially elongated upright hopper of generally uniform transverse inner cross-section configuration along the length thereof, a pressure plate of a cross-section conforming substantially with said inner cross-section of the hopper positioned within said hopper and arranged for selective axial movement therein, screw means for effecting axial movement of said pressure plate, a moulding plate positioned across the lower end of said hopper and defining therein a plurality of spaced apertures arranged in a pre-selected pattern and through which pizza meat may be extruded under pressure from said pressure plate, a second plate spaced below and parallel to said first moulding plate and defining therein a plurality of spaced apertures which are in register with the plurality of spaced apertures in said first plate so that said apertures in said second plate are adapted to receive and transmit therethrough portions of the meat extrusions issuing from said first plate, and means for selectively severing discrete spaced chunks of meat from the spaced extrusions which are passing through the apertures in the second plate to provide spaced chunks of meat arranged in a pre-selected pattern, said severing means including a selectively movable severing plate positioned in the space between said parallel plates and defining therein a plurality of spaced apertures which are adapted, when in one position of said severing plate, to be registered with the plurality of apertures in said plates, and when in another position the apertures in said severing plate are offset relative to said apertures in the plates, spring means normally biasing the severing plate toward the position wherein the apertures therethrough are in register with the apertures in said moulding plates, cam means for effecting selective movement of said severing plate against the bias of said spring means, and a single source of power for effecting selective operation both of said cam means and of said screw means.

2. A pizza meat dispenser comprising, in combination, an axially elongated hopper of generally uniform transverse inner cross-section configuration along the length thereof, movable pressure means entering said storage space through one end thereof and arranged for advancement toward the other end of said hopper to effect feeding of pizza meat under pressure toward said other end of the hopper, a relatively thick moulding plate positioned across said other end of said hopper and defining therein a plurality of spaced apertures arranged in a pre-selected pattern and through which pizza meat may be extruded under pressure from said pressure plate, a second plate spaced from and parallel to said first moulding plate and defining therein a plurality of spaced apertures which are in register with the plurality of spaced apertures in said first plate so that said apertures in said second plate are adapted to receive and transmit therethrough portions of the meat extrusions issuing from said first plate, a relatively thin selectively movable severing plate positioned in the space between said parallel plates and defining therein a plurality of spaced apertures which are adapted, when in one position of said severing plate, to be registered with the plurality of apertures in said plates, and when in another position the apertures in said severing plate are offset relative to said apertures in the plates, and means for selectively moving said severing plate between said one and another positions to effect segmenting of the lengths of pizza meat being extruded through the plates to provide a plurality of discrete spaced chunks of meat arranged in a pre-selected pattern.

3. A pizza meat dispenser comprising, in combination, an axially elongated hopper of generally uniform transverse inner cross-section configuration along the length thereof, movable pressure means entering said storage space through one end thereof and arranged for advancement toward the opposite end to effect feeding of pizza meat under pressure toward said other end of said storage space, a moulding plate positioned across said other end of said hopper and defining therein a plurality of spaced apertures arranged in a pre-selected pattern and through which pizza meat may be extruded under pressure from said pressure plate, a second plate spaced from and parallel to said first moulding plate and defining therein a plurality of spaced apertures which are in register with the plurality of spaced apertures in said first plate so that said apertures in said second plate are adapted to receive and transmit therethrough portions of the meat extrusions issuing from said first plate, a selectively movable relatively thin severing plate positioned in the space between said parallel plates and defining therein a plurality of spaced apertures which are adapted, when in one position of said severing plate, to be registered with the plurality of apertures in said plates, and when in another position the apertures in said severing plate are offset relative to said apertures in the plates, means for selectively moving said severing plate between said pair of positions to effect discrete segmenting of the lengths of pizza meat being extruded through the plates to provide a plurality of discrete spaced chunks of meat arranged in a pre-selected pattern, and said moulding plate being of substantial axial thickness relative to the thickness of both severing plate and said second plate, so as to withstand the pressure thereon from the pressure means through the pizza meat and so as to provide relative elongated extrusion passageways therethrough which assist in defining the contour of the meat extrusion passing therethrough.

4. A pizza meat dispenser comprising, in combination, an axially elongated hopper of generally uniform transverse inner cross-section configuration along the length thereof, movable pressure means entering said storage space through one end thereof and arranged for advancement toward the opposite end to effect feeding of pizza meat under pressure toward said other end of said storage space, a moulding plate positioned across said other end of said hopper and defining therein a plurality of spaced apertures arranged in a pre-selected pattern and through which pizza meat may be extruded under pressure from said pressure plate, a second plate spaced from and parallel to said first moulding plate and defining therein a plurality of spaced apertures which are in register with the plurality of spaced apertures in said first plate, a selectively movable severing plate positioned in the space between said parallel plates and defining therein a plurality of spaced apertures which are adapted, when in one position of said severing plate, to be registered with the plurality of apertures in said plates, and when in another position the apertures in said severing plate are offset relative to said apertures in the plates, means for selectively moving said severing plate between said pair of positions to effect segmenting of the lengths of pizza meat being extruded through the plates to provide a plurality of discrete spaced chunks of meat arranged in a pre-selected pattern, and adjustment means for selectively varying the area within which pizza meat is dispensed from said dispenser, said adjustment means including an annular ring poistioned against said moulding plate within the hopper with apertures therethrough adapted for registering with certain of the extrusion apertures in said moulding plate, and said ring being rotatable relative to said moulding plate between a position of aperture registration and a position of aperture misalignment.

5. A pizza meat dispenser comprising, in combination, an axially elongated hopper of generally uniform transverse inner cross-section configuration along the length thereof, movable pressure means entering said storage space through one end thereof and arranged for advancement toward the opposite end to effect feeding of pizza meat under pressure toward said other end of said storage space, a moulding plate positioned across said other end of said hopper and defining therein a plurality of spaced apertures arranged in a pre-selected pattern and through which pizza meat may be extruded under pressure from said pressure plate, a second plate spaced from and parallel to said first moulding plate and defining therein a plurality of spaced apertures which are in register with the plurality of spaced apertures in said first plate, a selectively movable severing plate positioned in the space between said parallel plates and defining therein a plurality of spaced apertures which are adapted, when in one position of said severing plate, to be registered with the plurality of apertures in said plates, and when in another position the apertures in said severing plate are offset relative to said apertures in the plates, means for selectively moving said severing plate between said pair of positions to effect segmenting of the lengths of pizza meat being extruded through the plates to provide a plurality of discrete spaced chunks of meat arranged in a pre-selected pattern, and adjustment means for selectively varying the area within which pizza meat is dispensed from said dispenser, said adjustment means including an annular ring positioned against said moulding plate within the hopper with apertures therethrough adapted for registering with certain of the extrusion apertures in said moulding plate, said ring being rotatable relative to said moulding plate between a position of aperture registration and a position of aperture misalignment, a manual control for effecting selective movement of said ring between said two positions including an elongated horizontal slot in said hopper, and a control stem carried by said annular ring and extending through said slot outwardly of said hopper, and the two ends of the slot in the hopper serving to engage the control stem to effect positioning of said annular ring in one or the other of the said two positions for the ring.

6. A pizza meat dispenser comprising, in combination, means defining an elongated upright storage space for receiving therein a supply of pizza meat, pressure means entering said storage space through the upper end thereof for selective advancement toward the lower end to effect feeding of pizza meat under pressure toward said lower end of said storage space, dispensing means adjacent the lower end of said storage space including a relatively thick extrusion-forming plate having apertures therethrough arranged in a preselected pattern for receiving the pizza meat under pressure of said pressure means, and for forming the meat into a plurality of laterally spaced extrusions arranged in a preselected pattern, and means for selectively severing discrete chunks of pizza meat from the lower ends of said extrusions issuing from said extrusion-forming plate, said means including a severing member positioned below said extrusion-forming plate and having apertures therein which are normally registered with and of a size not smaller than the apertures in said extrusion-forming plate, said severing means being of relatively thin dimension with respect to said extrusion-forming plate to facilitate severing of the extrusions of pizza meat, so that the extrusions from said extrusion-forming plate normally pass unhindered through and below said severing member, and means for selectively actuating said severing means so as to form severed discrete chunks of pizza meat from said extrusions, whereupon the severed chunks of pizza meat will fall under gravity in the preselected pattern beneath the dispenser, and means for supporting said severing member in cooperative relationship with said extrusion-forming plate.

7. A pizza meat dispenser comprising, in combination, means defining an elongated upright storage space for receiving therein a supply of pizza meat, pressure means entering said storage space through the upper end thereof for selective advancement toward the lower end to effect feeding of pizza meat under pressure toward said lower end of said storage space, dispensing means adjacent the lower end of said storage space including a relatively thick extrusion-forming plate having apertures therethrough arranged in a preselected pattern for receiving the pizza meat under pressure of said pressure means, and for forming the meat into a plurality of laterally spaced extrusions arranged in a preselected pattern, and means for selectively severing discrete chunks of pizza meat from the lower ends of said extrusions issuing from said extrusion-forming plate, said means including a severing member positioned below said extrusion-forming plate and having apertures therein which are normally registered with and of a size not smaller than the apertures in said extrusion-forming plate, said severing means being of relatively thin dimension with respect to said extrusion-forming plate to facilitate severing of the extrusions of pizza meat, so that the extrusions from said extrusion-forming plate normally pass unhindered through and below said severing member, means for selectively actuating said severing means so as to form severed discrete chunks of pizza meat from said extrusions, whereupon the severed chunks of pizza meat will fall under gravity in the preselected pattern beneath the dispenser, and means for holding said severing means against said extrusion-forming plate while permitting relative sliding movement between said severing member and said extrusion-forming plate.

References Cited in the file of this patent

UNITED STATES PATENTS

| | | |
|---|---|---|
| 309,832 | Edwards | Dec. 30, 1884 |
| 828,207 | Herschel | Aug. 7, 1906 |
| 848,540 | Early | Mar. 26, 1907 |
| 930,920 | Bartz | Aug. 10, 1909 |
| 1,636,424 | Lutostanski | July 19, 1927 |
| 2,425,912 | Appel et al. | Aug. 19, 1947 |
| 2,801,773 | Vitkin | Aug. 6, 1957 |

FOREIGN PATENTS

| | | |
|---|---|---|
| 24,042 | Great Britain | Dec. 2, 1899 |